(No Model.)  2 Sheets—Sheet 1.
J. H. COX & J. F. MORRISEY
CHECK ROW ATTACHMENT.
No. 256,547.  Patented Apr. 18, 1882.
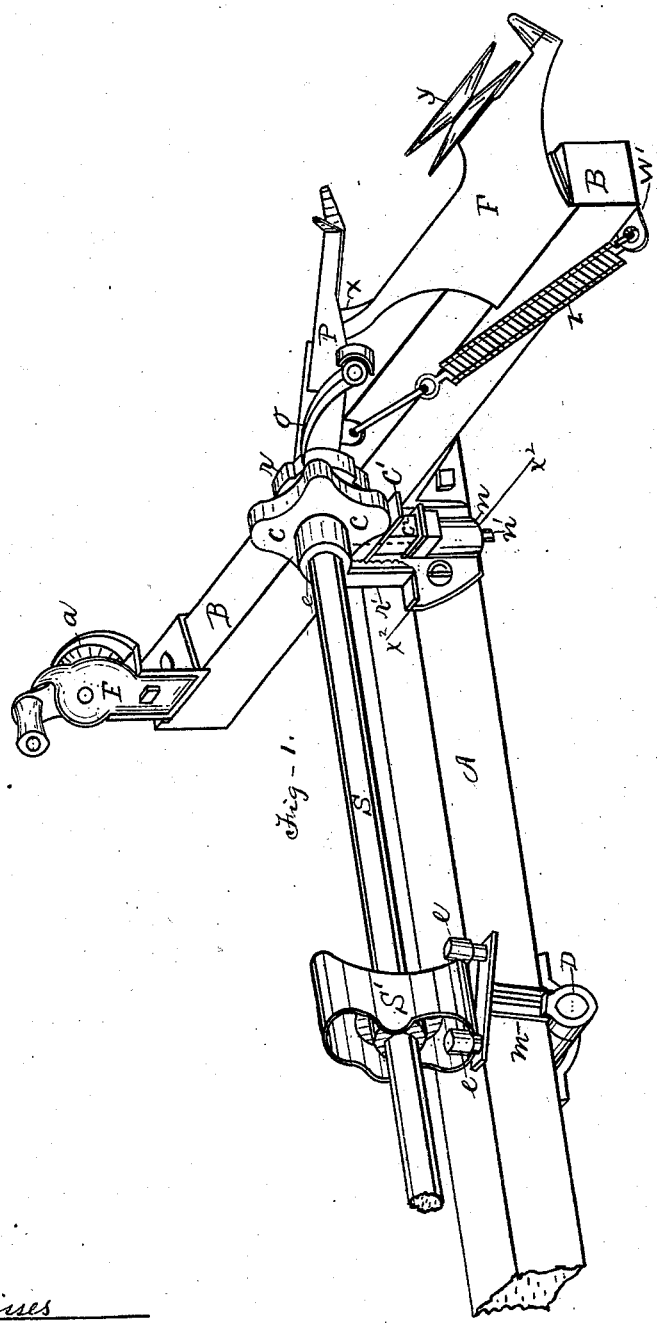

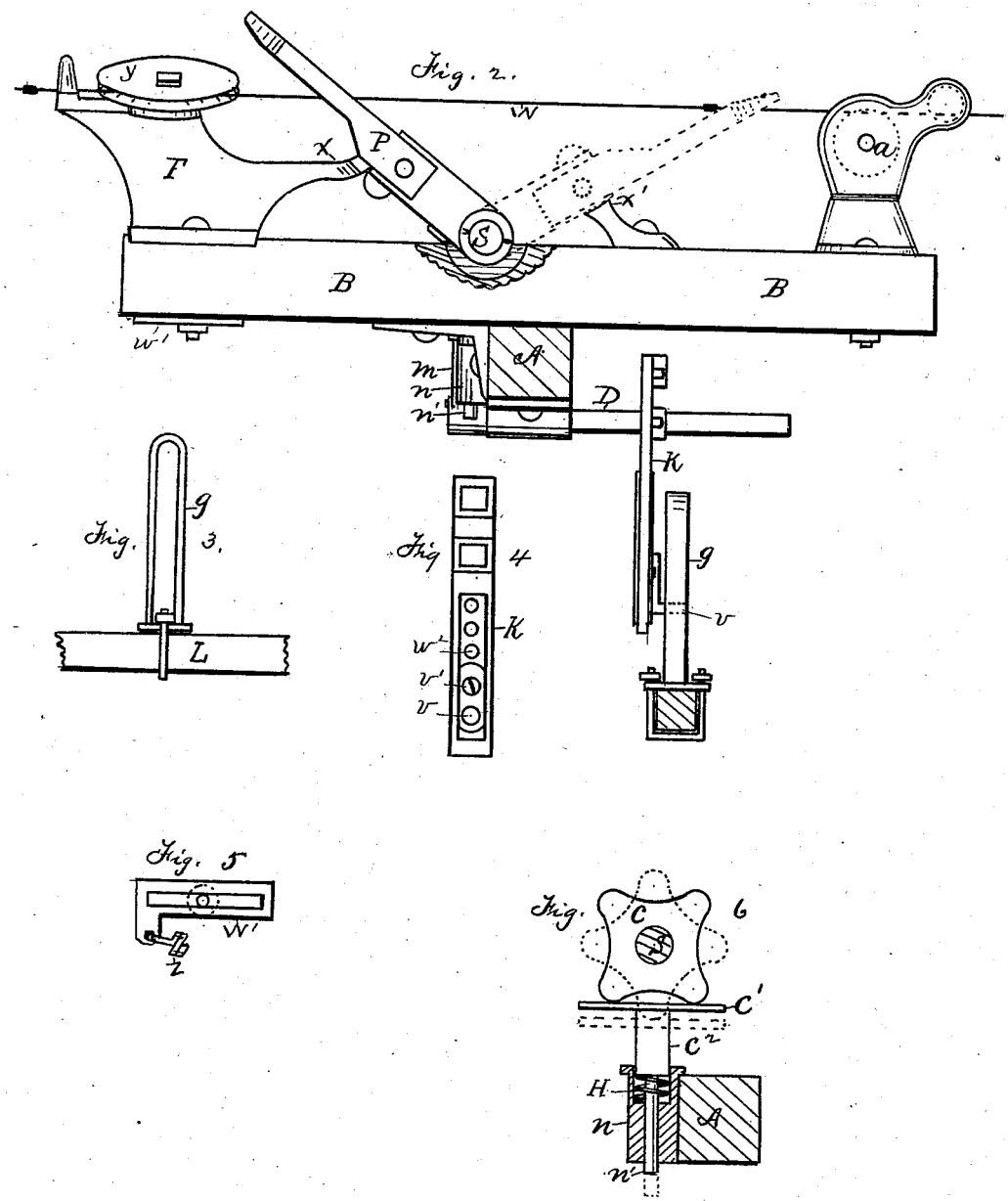

UNITED STATES PATENT OFFICE.

JOSHUA H. COX AND JAMES F. MORRISEY, OF JOLIET, ILLINOIS, ASSIGNORS TO AMOS N. KLINEFELTER AND ANDREW DILLMAN, OF SAME PLACE.

CHECK-ROW ATTACHMENT.

SPECIFICATION forming part of Letters Patent No. 256,547, dated April 18, 1882.

Application filed January 3, 1882. (No model.)

*To all whom it may concern:*

Be it known that we, JOSHUA H. COX and JAMES F. MORRISEY, of the city of Joliet, in Will county, in the State of Illinois, have invented certain Improvements in Check-Rower Attachments for Seed-Planters, the construction and operation of which we will proceed to explain, reference being had to the annexed drawings and the letters and figures thereon, in which—

Figure 1 is a perspective view; Fig. 2, an end elevation; Fig. 3, a front view of the slotted standard that actuates the seed-slide; Fig. 4, a front view of the adjustable crank $k$; Fig. 5, a plan view on the top of the slotted spring-plate $w'$; and Fig. 6, a vertical sectional view on the line $x^2$, Fig. 1.

The nature and object of this invention are to operate the dropping part of a corn or seed planter by means of an attachment which derives its motion from a knotted wire or cord stretched across the field in the direction the machine travels, which attachment is designed to be adjusted to almost any of the corn or seed planters in use having the grain dropped from a hopper through a shoe below and covered by a traveling wheel following the shoe.

Referring to the drawings, A represents the main cross bar or beam, which attaches by any suitable means to the planter below, which planter we do not illustrate, as in this case it forms no part of our invention. The beam A is furnished at either end with the cross-head B, to sustain the sheaves $a$ and $y$ and other portions of the device.

Above the beam A, and running parallel with its entire length, is located the shaft S, journaled at either end in suitable boxing, and also at any other place desired along its length, by proper standards attached to the beam A, as shown in Fig. 1. The shaft S bears at either end a forked oscillating lever, P, fitting loosely on it, and said shaft is also provided with the ratchet-wheel $r$, firmly keyed to it next inside the forked lever P. As the machine travels forward the knots in the cord or wire $w$, as it passes through the fork of the lever P, will carry the said lever backward, as shown in the dotted lines in Fig. 2, until the knot slips out and allows the coil-spring $z$ to return the forked lever to its original position. As the forked lever P so returns to its original position the pawl $o$, Fig. 1, attached to its side, engages with the ratchet $r$ and causes it to rotate the shaft S one-fourth around.

About central on the shaft S is located the cam-wheel S', the periphery of which is waved in form and so arranged that its waved periphery rotates between a pair of friction-rollers, $e$, on the upper end of the oscillating arm $m$, attached to the end of the counter-shaft D, to which it imparts an oscillating motion as the cam-wheel S' rotates. The counter-shaft D is extended at its outer end to some distance beyond the beam A, as shown in Fig. 2, which extended end is square to receive the crank $k$ through one of the square holes in its upper end, as shown in Fig. 4. By these holes being square the crank $k$ may stand at any place along on the shaft D to accommodate itself to the planter below.

By the use of more than one hole in the upper end of the crank $k$ it may be adjusted up or down to meet any planter below.

The wrist-pin $v$ may be adjusted up or down on the crank $k$ by means of the bolt $v'$ and the row of holes $w^2$, the long slot in the standard $g$ permitting the wrist-pin $v$ to operate at any place in it. By this adjustable arrangement the device may be used on almost any kind of planter.

One difficulty heretofore experienced in this class of check-rowers has been that the shaft S would not stop rotating at the exact time and place desired, or would not rotate far enough so as to leave the arm $m$ oscillated either one way or the other at its farthest extremity while the forked lever P was returning, after having thus rotated the shaft S partially around. To accomplish this the shaft S is provided with the cam-wheel $c$, having four projections, as shown in Figs. 1 and 6, and firmly keyed to said shaft. As the shaft S revolves one-fourth around, the cams on the cam-wheel $c$ impinge by sliding contact with the head $c'$ of the plunger $c^2$, depressing it upon the coil-spring H, as shown by the dotted lines in Fig. 6. The spring H is inclosed in the barrel $n$, which is attached to the side of the beam A, as shown in Fig. 1. The stem $n'$ is a continuation of the plunger $c^2$, and passes down through the spring H and barrel $n$ to steady it as it operates up and down. When the cam $c$ has rotated one-fourth around the plunger $c^2$ will press upward by means of the coil-spring H, so the head $c'$ will engage with two of the projections on it, as shown in Fig. 6, and thus prevent any further rotation of the shaft S either way until the forked lever P causes it to rotate, as before stated. This cam $c$ is set on the shaft S so the hollows on its periphery will be in line with projections in the periphery of the cam S', so that when the shaft S stops it leaves the arm $m$ oscillated to its extremity either one way or the other, as described, thus giving an exact and positive movement to the crank $k$, that moves the seed-slide, causing it to operate the dropping devices of the planter with very great precision.

The cross-head B supports the stops $x$ and $x'$, Fig. 2, for the purpose of arresting the progress of the forked lever P in either direction, so it will not rotate the shaft S too far or drop below the knotted cord or wire $w$, as it would without these stops. The slotted plate $w'$, to which the coil-spring $z$ attaches at its lower end, permits the tension of the said spring to be regulated as may be desired, as is obvious from its construction.

The particular features deemed to be new in this invention are the stop, consisting of the cam $c$ and the plunger $c^2$, the stops $x$ and $x'$, and the use of the perforated crank $k$, movable wrist-pin $v$, and slotted standard $g$, for the purposes for which they are described.

Having thus described our invention, what we claim as new, and desire to secure by Letters Patent is as follows, to wit:

In a check-rower attachment, the combination and arrangement of beam A, shaft S, cams $c$ and S', forked lever P, ratchet $r$, pawl $o$, coil-spring $z$, plunger $c^2$, coil-spring H, and barrel $n$, as and for the purpose set forth.

JOSHUA H. COX.
JAMES F. MORRISEY.

Witnesses:
THOS. H. HUTCHINS,
AMOS N. KLINEFELTER.